United States Patent [19]

Tanaka

[11] Patent Number: 5,555,133
[45] Date of Patent: Sep. 10, 1996

[54] OBJECTIVE LENS FOR MICROSCOPE

[75] Inventor: Takaaki Tanaka, Hachioji, Japan

[73] Assignee: Olympus Optical Co., Ltd., Tokyo, Japan

[21] Appl. No.: 359,723

[22] Filed: Dec. 20, 1994

[30] Foreign Application Priority Data

Dec. 21, 1993 [JP] Japan ................................. 5-321920

[51] Int. Cl.⁶ .............................. G02B 15/02; G02B 3/00
[52] U.S. Cl. ............................. 359/673; 359/362; 359/642
[58] Field of Search ................................ 359/382, 368, 359/379, 383, 503, 511, 656–661, 362–363, 368–389, 642, 672–673, 677

[56] References Cited

U.S. PATENT DOCUMENTS 3,572,902  3/1971  Uetake ................................... 359/658
5,052,791 10/1991  Kikuchi ................................ 359/642
5,247,392  9/1993  Plies ...................................... 359/660

FOREIGN PATENT DOCUMENTS 52-72735  5/1977  Japan .
61-16526  1/1986  Japan .
 889687   2/1962  United Kingdom ................... 359/656

Primary Examiner—Thong Nguyen
Attorney, Agent, or Firm—Cushman, Darby & Cushman

[57] ABSTRACT

An objective lens for microscopes has an optical unit removably disposed at the front end of the objective lens. The optical unit includes at least two kinds of optical elements having different optical properties. Thus, the objective lens for microscopes can always maintain good imaging performance in the case where either a glass or plastic vessel is used.

8 Claims, 4 Drawing Sheets

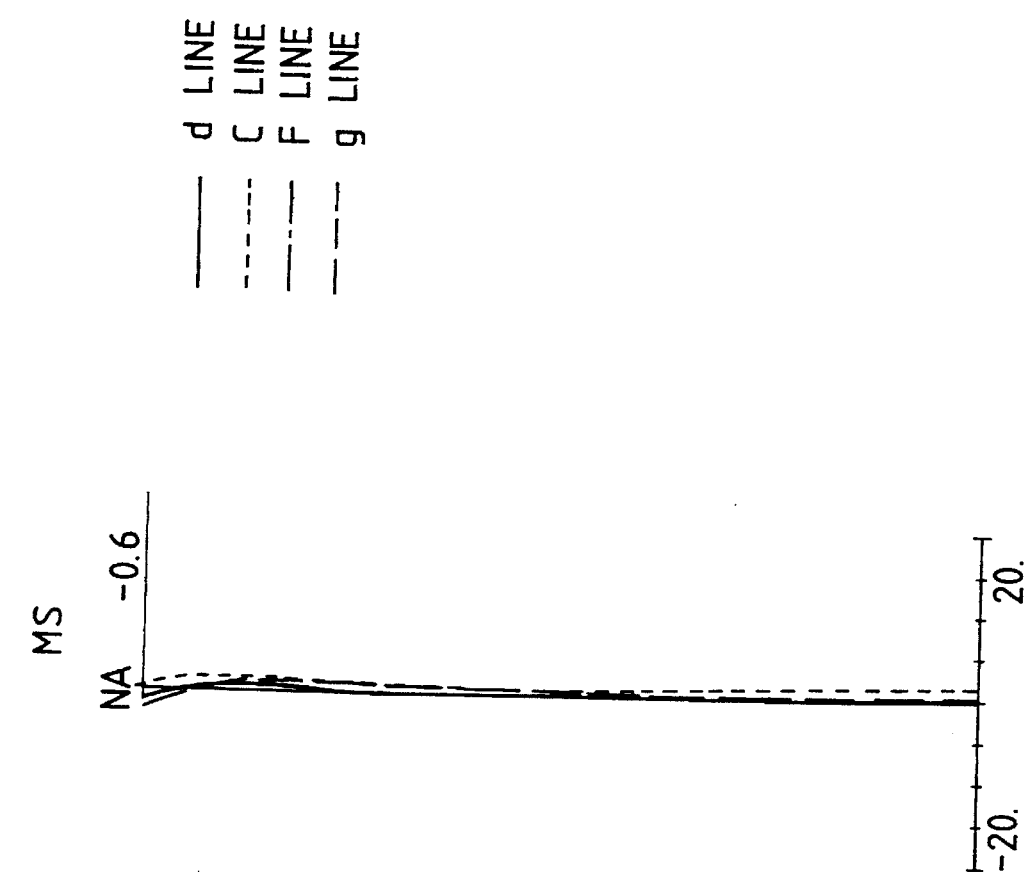
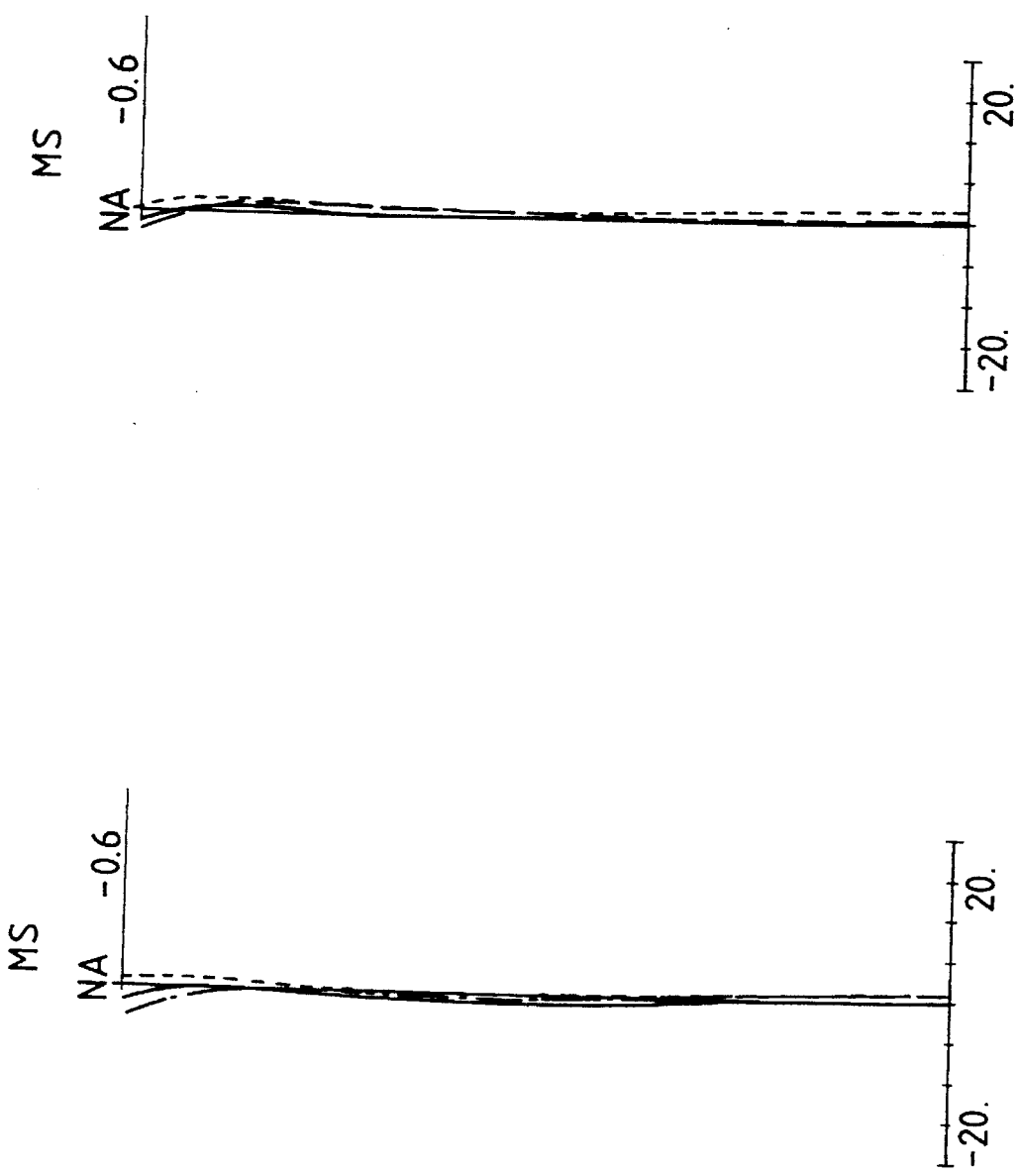

OBJECTIVE LENS FOR MICROSCOPE

BACKGROUND OF THE INVENTION

1. Field of the Invention

This invention relates to an objective lens used for microscopes and, in particular, to an objective lens suitable for microscopy of a specimen through a thick plane-parallel plate, such as a cultivating vessel or a liquid crystal display substrate.

2. Description of Related Art

In general microscopy, when a thick plane-parallel plate is interposed between a specimen and an objective lens, spherical aberration will be produced depending on its thickness. For conventional objective lenses, the following two techniques of correcting for spherical aberration have been chiefly adopted.

(1) A lens unit which is movable along the optical axis is disposed in an objective unit, which is corrected for spherical aberration by the movement of the lens unit and which is usually called an objective lens with a rotary ring for fine adjustment of focus.

(2) A removal, transparent plane-parallel member is previously disposed at the front end of an objective lens, and the thickness of the plane-parallel member is changed so that spherical aberration can be corrected depending on the thickness of a plane-parallel plate lying on the specimen side (for example, a technique set forth in Japanese Utility Model Preliminary Publication No. Sho 61-16526).

In either of the techniques mentioned above, it is common practice for design of the objective lens to use the characteristic values of a particular material (optical element) or virtual values as the optical constants (refractive index and Abbe's number) of a thick plane-parallel plate, assumed as a vessel, on the specimen side.

However, where an objective lens produced through either of the above techniques is actually used, if the optical constants of the thick plane-parallel plate employed on the specimen side differ from those assumed in the design of the objective lens, its optimum imaging performance will not be obtained. For example, consider the case where a cultivating vessel is used for observation of cells. Cultivating vessels are available in glass and plastic materials. If an objective lens used in this case is designed on the assumption that tile plane-parallel plate is made of glass, the optimum imaging performance will be secured in the case where the cultivating vessel of glass is employed. Conversely, the use of the cultivating vessel of plastic leads to a degraded contrast of an image available. This is because the dispersion values (usually called Abbe's numbers) of materials of the plane-parallel plates are different from each other. In this way, when the plane-parallel plate assumed in the design of the objective lens is different in material from that in practical use, there is the problem that the above phenomenon is produced and consequently, design performance cannot be brought about (refer to FIGS. 1A and 1B).

It may be considered that an objective lens is designed so that a plurality of plane-parallel plates constructed of different materials is actually used and their refractive indices and Abbe's numbers are set to the respective average values. However, this approach, although reducing the difference in imaging performance between the plane-parallel plates, has the problem that the imaging performance exhibits a compromise state and thus the optimum imaging performance cannot be obtained.

SUMMARY OF THE INVENTION

It is, therefore, an object of the present invention to provide an objective lens for microscopes in which, where a relative thick plane-parallel plate is interposed between a specimen and an objective lens in microscopy, good imaging performance can always be maintained, irrespective of material of the plane-parallel plate used.

In order to achieve this object, the objective lens for microscopes according to the present invention is constructed so that an optical unit is removably disposed at the front end of the objective lens and include a combination of at least two kinds of optical elements having different optical properties.

This and other objects as well as the features and advantages of the present invention will become apparent from the following detailed description of the preferred embodiments when taken in conjunction with the accompanying drawings.

BRIEF DESCRIPTION OF THE DRAWINGS

FIGS. 7A and 7B are diagrams showing characteristics of spherical aberrations in the embodiments of FIGS. 4 and 6, respectively.

DETAILED DESCRIPTION OF THE PREFERRED EMBODIMENTS

Before undertaking the description of the embodiments, fundamental principles of the present invention will be explained in detail below.

Figure 1B:
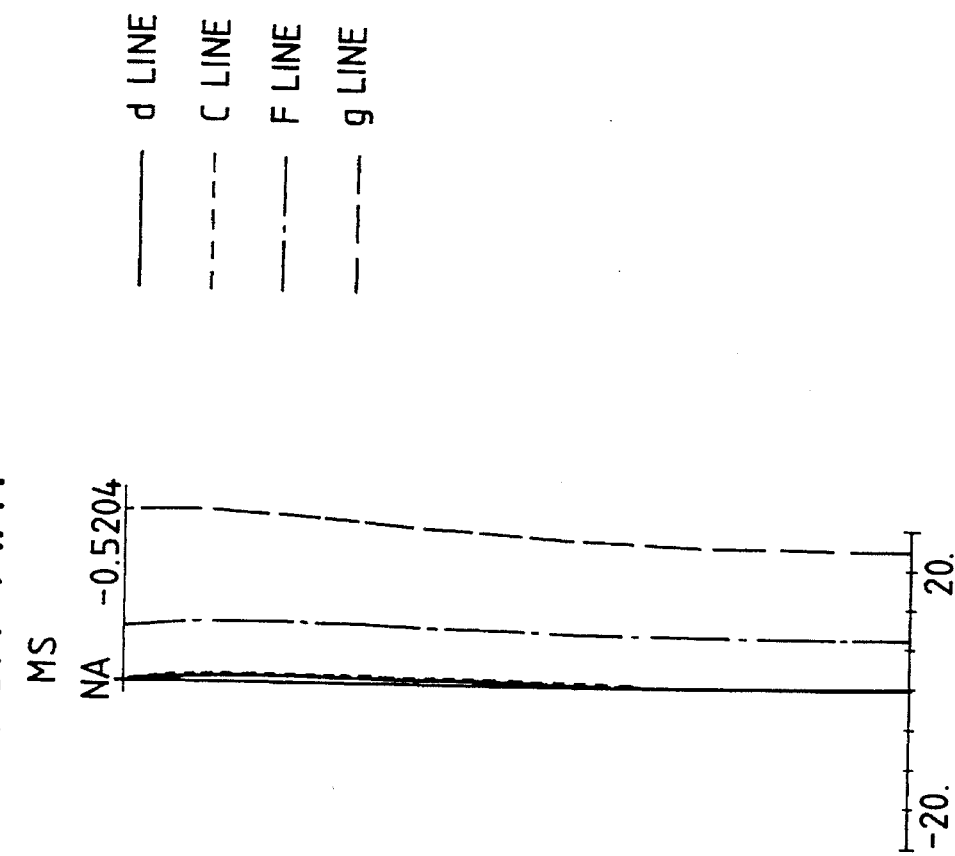
FIGS. 1A and 1B are diagrams showing characteristics of spherical aberrations of a conventional objective lens for microscopes where cultivating glass and plastic vessels 1 mm thick are used respectively.
Figure 1A:
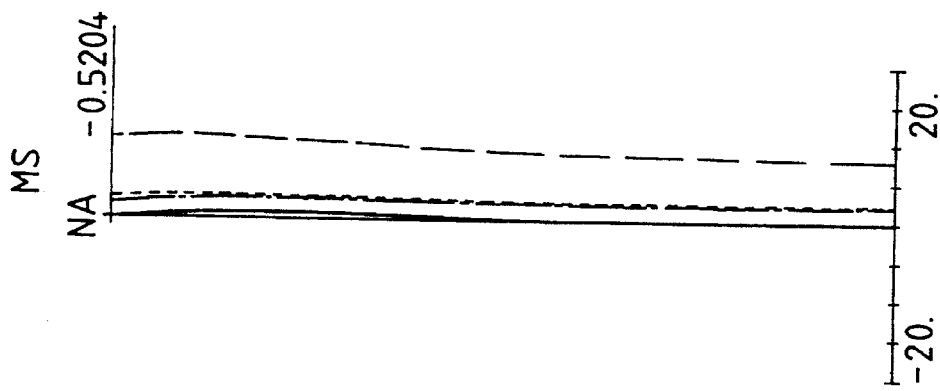
Figure 2A:
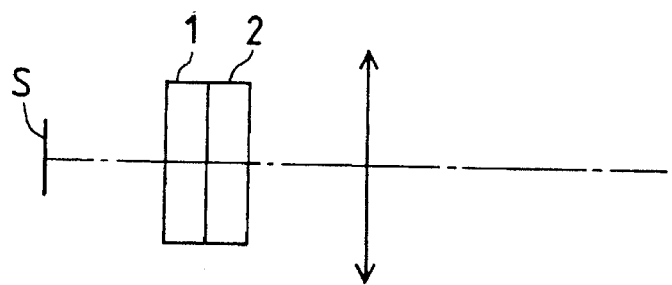
FIGS. 2A, 2B, and 2C are explanatory views of a primary principle where plane-parallel members are used in an objective lens for microscopes according to the present invention.

FIG. 2A shows the case where a plane-parallel plate, such as a vessel, does not lie between a specimen S and an objective lens (the case of the so-called no-cover objective lens). Reference numerals 1 and 2 denote plane-parallel members (made from different materials), which are removably arranged on the objective side (at the right hand of the figure).

Figure 2B:
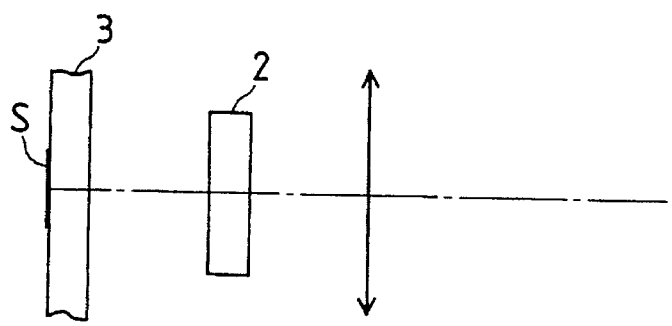

FIG. 2B shows the case where a plane-parallel plate 3, made from material having an optical property nearly equal to that of the plane-parallel member 1, is interposed, as a vessel, between the specimen S and the objective lens. In this instance, as shown in the figure, only the plane-parallel member 2 is disposed at the front end of the objective lens. If the optical property of the plane-parallel plate 3 is almost the same as that of the plane-parallel member 1, the case shown in FIG. 2A can be regarded as practically equivalent in optical performance to that in FIG. 2B. Hence, the plane-parallel member 2 can hold a good optical property without undergoing the influence of the plane-parallel plate 3.

Figure 2C:
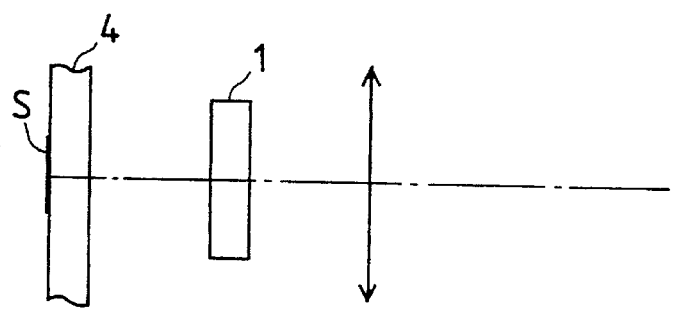

FIG. 2C, contrary to FIG. 2B, depicts the case where a plane-parallel plate 4, made from material having an optical property nearly equal to that of the plane-parallel member 2, is interposed between the specimen S and the objective lens. In this case, only the plane-parallel member 1 is disposed at the front end of the objective lens and thereby a good optical property can be held as in FIG. 2B.

In this way, when two kinds of plane-parallel members are removably disposed at the front end of the objective lens, the plane-parallel plates to be interposed between the specimen and the objective lens are also available in two kinds as in the plane-parallel members, and the objective lens capable of holding good imaging performance can be provided. If at least three kinds of plane-parallel members constructed of different materials are combined and removably disposed at the front end of the objective lens, the plane-parallel plates to be interposed between the specimen and the objective lens can be used by the same number of kinds as the plane-parallel members, and good imaging performance can be maintained.

Figure 3:
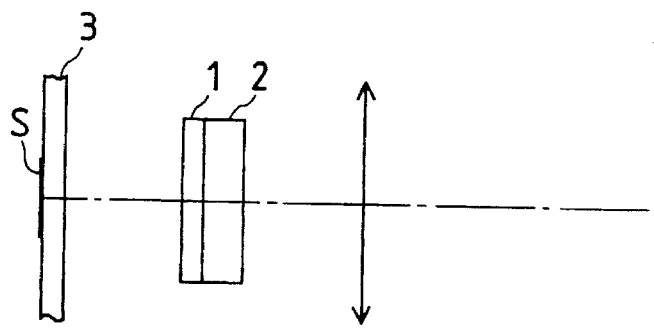
FIG. 3 is an explanatory view of a secondary principle.

If, as shown in FIG. 3, the thicknesses of the plane-parallel plates 1 and 2 are optimized corresponding to that of the plane-parallel plate 3 interposed between the specimen S and the objective lens, better imaging performance can be secured.

Thus, by the placement of the plane-parallel members which are removable at the front end of the objective lens and are constructed from a combination of at least two kinds of optical elements having different optical properties, the objective lens for microscopes can be realized which is not affected by the optical property of the plane-parallel plate interposed between the specimen and the objective lens and is capable of keeping good imaging performance.

Referring now to the drawings, the embodiments of the present invention will be explained below.

Figure 4:
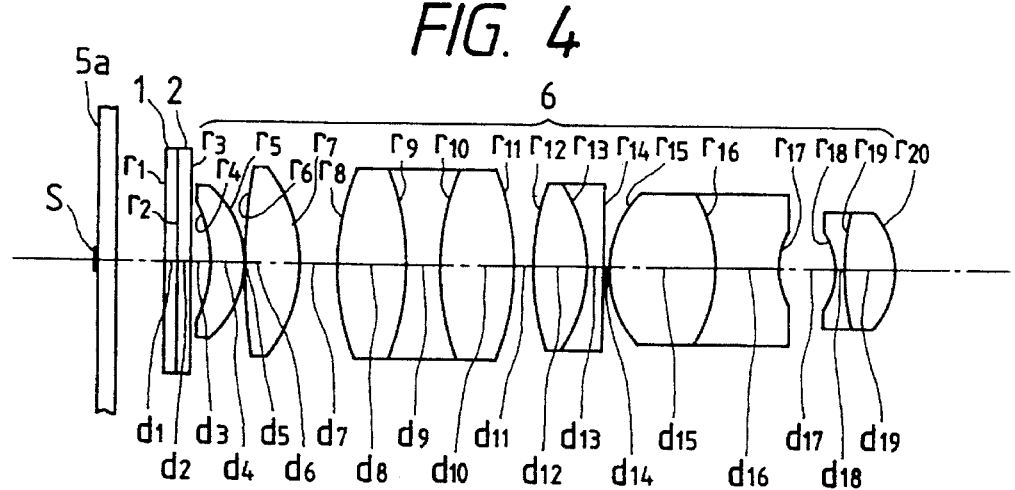
FIG. 4 is a view showing the arrangement of one embodiment in which a cultivating glass vessel is used in the objective lens for microscopes having the plane-parallel members of the present invention.

In FIG. 4, reference numeral 5a represents a glass vessel in which the specimen S is incorporated and 6 represents an objective system. The plane-parallel members 1 and 2 are removably arranged. Table 1 gives the optical properties of the plane-parallel members 1 and 2 used when the specimen S is incorporated in the glass vessel 5a for microscopy.

TABLE 1

| | | | |
|---|---|---|---|
| Plane-parallel member 1 | $n_d = 1.52287$ | $v_d = 59.89$ | $t_d = 0.8$ |
| Plane-parallel member 2 | $n_d = 1.68893$ | $v_d = 31.08$ | $t_d = 0.9$ |

In Table 1, $n_d$ is the refractive index of the plane-parallel plate, $v_d$ is Abbe's number, and $t_d$ is the thickness.

Numerical data of the objective lens of the embodiment in FIG. 4 are shown below.

Glass vessel; thickness $t = 1.2$, $n_d = 1.52287$, $v_d = 59.89$
Objective lens; numerical aperture = 0.6, working distance = 2.292

| | | | |
|---|---|---|---|
| $r_1 = \infty$ | | | |
| | $d_1 = 0.8$ | $n_1 = 1.52287$ | $v_1 = 59.89$ |
| $r_2 = \infty$ | | | |

-continued

Glass vessel; thickness $t = 1.2$, $n_d = 1.52287$, $v_d = 59.89$
Objective lens; numerical aperture = 0.6, working distance = 2.292

| | | | |
|---|---|---|---|
| $r_3 = \infty$ | $d_2 = 0.9$ | $n_2 = 1.68893$ | $v_2 = 31.08$ |
| | $d_3 = 1.6834$ | | |
| $r_4 = -9.2996$ | | | |
| | $d_4 = 2.1844$ | $n_4 = 1.816$ | $v_4 = 46.62$ |
| $r_5 = -6.1362$ | | | |
| | $d_5 = 0.1503$ | | |
| $r_6 = 56.4427$ | | | |
| | $d_6 = 3.0661$ | $n_6 = 1.43875$ | $v_6 = 94.97$ |
| $r_7 = -10.3567$ | | | |
| | $d_7 = 2.9767$ | | |
| $r_8 = 16.041$ | | | |
| | $d_8 = 3.8377$ | $n_8 = 1.43875$ | $v_8 = 94.97$ |
| $r_9 = -26.1712$ | | | |
| | $d_9 = 2.4048$ | $n_9 = 1.6765$ | $v_9 = 37.54$ |
| $r_{10} = 15.03$ | | | |
| | $d_{10} = 3.8376$ | $n_{10} = 1.43875$ | $v_{10} = 94.97$ |
| $r_{11} = -15.03$ | | | |
| | $d_{11} = 1.5771$ | | |
| $r_{12} = 24.8095$ | | | |
| | $d_{12} = 2.7755$ | $n_{12} = 1.43875$ | $v_{12} = 94.97$ |
| $r_{13} = -9.7194$ | | | |
| | $d_{13} = 1.1022$ | $n_{13} = 1.7865$ | $v_{13} = 50$ |
| $r_{14} = \infty$ | | | |
| | $d_{14} = 0.3006$ | | |
| $r_{15} = 7.015$ | | | |
| | $d_{15} = 6.5631$ | $n_{15} = 1.497$ | $v_{15} = 81.61$ |
| $r_{16} = 10.1903$ | | | |
| | $d_{16} = 4.018$ | $n_{16} = 1.6445$ | $v_{16} = 40.82$ |
| $r_{17} = 3.8106$ | | | |
| | $d_{17} = 3.4489$ | | |
| $r_{18} = -4.508$ | | | |
| | $d_{18} = 0.8016$ | $n_{18} = 1.74$ | $v_{18} = 31.71$ |
| $r_{19} = 13.8917$ | | | |
| | $d_{19} = 2.986$ | $n_{19} = 1.80518$ | $v_{19} = 25.43$ |
| $r_{20} = -6.6202$ | | | |

Figure 5:
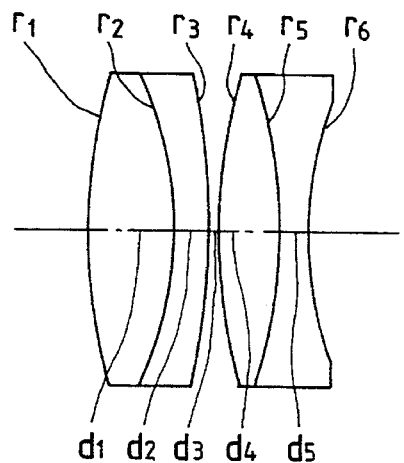
FIG. 5 is a view showing the arrangement of an imaging lens used in combination with the objective lens for microscopes of the present invention.

This embodiment is the objective lens designed to correct for aberration at infinity, which is used in combination with an imaging lens shown in FIG. 5.

Numerical data of the imaging lens are as follows:

| | | | |
|---|---|---|---|
| $r_1 = 68.6191$ | | | |
| | $d_1 = 8.26$ | $n_1 = 1.48749$ | $v_1 = 70.2$ |
| $r_2 = -66.3235$ | | | |
| | $d_2 = 3.4399$ | $n_1 = 1.82610$ | $v_1 = 40.95$ |
| $r_3 = -102.56$ | | | |
| | $d_3 = 0.7349$ | | |
| $r_4 = 84.382$ | | | |
| | $d_4 = 5.56$ | $n_4 = 1.834$ | $v_4 = 37.16$ |
| $r_5 = -50.6219$ | | | |
| | $d_5 = 3.2999$ | $n_5 = 1.6445$ | $v_5 = 40.32$ |
| $r_6 = 40.6499$ | | | |

Figure 6:
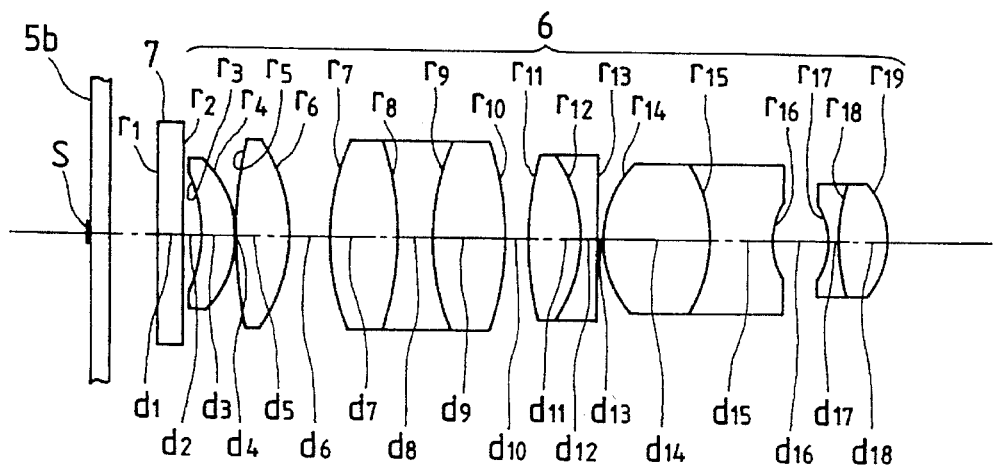
FIG. 6 is a view showing the arrangement of another embodiment in which a cultivating plastic (styrol) vessel is used instead of the glass vessel of FIG. 4.

As shown in FIG. 6, when the specimen S encased in a plastic vessel 5b is observed, the optical properties of plastic approximate to $n_d = 1.59$ and $v_d = 31$, so that the plastic vessel 5b becomes optically equivalent in dispersion to the plane-parallel member 2 and then in chromatic aberration thereto. Thus, instead of the plane-parallel members 1 and 2, a plane-parallel member 7 having the optical properties given in Table 2 is used.

TABLE 2

| | | | |
|---|---|---|---|
| Plane-parallel member 7 | $n_d = 1.52287$ | $v_d = 59.89$ | $t_d = 1.76$ |

Numerical data of the objective lens of the embodiment in FIG. 6 are shown below.

Glass vessel; thickness t = 1.1, $n_d$ = 1.591, $v_d$ = 31
Objective lens; numerical aperture = 0.6, working distance = 2.295

| | | | |
|---|---|---|---|
| $r_1 = \infty$ | | | |
| | $d_1 = 1.76$ | $n_1 = 1.52287$ | $v_1 = 59.89$ |
| $r_2 = \infty$ | | | |
| | $d_2 = 1.6834$ | | |
| $r_3 = -9.2996$ | | | |
| | $d_3 = 2.1844$ | $n_3 = 1.816$ | $v_3 = 46.62$ |
| $r_4 = -6.1362$ | | | |
| | $d_4 = 0.1503$ | | |
| $r_5 = 56.4427$ | | | |
| | $d_5 = 3.0621$ | $n_5 = 1.43875$ | $v_5 = 94.97$ |
| $r_6 = -10.3567$ | | | |
| | $d_6 = 2.9767$ | | |
| $r_7 = 16.041$ | | | |
| | $d_7 = 3.8377$ | $n_7 = 1.43875$ | $v_7 = 94.97$ |
| $r_8 = -26.1712$ | | | |
| | $d_8 = 2.4048$ | $n_8 = 1.6765$ | $v_8 = 37.54$ |
| $r_9 = 15.03$ | | | |
| | $d_9 = 1.492$ | $n_9 = 1.43875$ | $v_9 = 94.97$ |
| $r_{10} = -15.03$ | | | |
| | $d_{10} = 1.5771$ | | |
| $r_{11} = 24.8095$ | | | |
| | $d_{11} = 2.7755$ | $n_{11} = 1.43875$ | $v_{11} = 94.97$ |
| $r_{12} = 9.7194$ | | | |
| | $d_{12} = 1.1022$ | $n_{12} = 1.7865$ | $v_{12} = 50$ |
| $r_{13} = \infty$ | | | |
| | $d_{13} = 0.3006$ | | |
| $r_{14} = 7.015$ | | | |
| | $d_{14} = 6.5631$ | $n_{14} = 1.497$ | $v_{14} = 81.61$ |
| $r_{15} = -10.1903$ | | | |
| | $d_{15} = 4.018$ | $n_{15} = 1.6445$ | $v_{15} = 40.82$ |
| $r_{16} = 3.8106$ | | | |
| | $d_{16} = 3.4489$ | | |
| $r_{17} = -4.508$ | | | |
| | $d_{17} = 0.8016$ | $n_{17} = 1.74$ | $v_{17} = 31.71$ |
| $r_{18} = 13.8917$ | | | |
| | $d_{18} = 2.986$ | $n_{18} = 1.80518$ | $v_{18} = 25.43$ |
| $r_{19} = -6.6202$ | | | |

This embodiment is the objective lens designed to correct for aberration at infinity, which is used in combination with an imaging lens shown in FIG. 5.

In the respective lens data, represent r1, r2, . . . represent radii of curvature of individual lens surfaces; d1, d2, . . . thicknesses of individual lenses or spaces therebetween; n1, n2, . . . refractive indices of individual lenses; and v1, v2, Abbe's numbers of individual lenses.

The characteristic curves of spherical aberrations in the above embodiments are shown in FIGS. 7A and 7B.

For a change of spherical aberration by the difference of the refractive index nd between the plane-parallel members 2 and 7, when the NA (numerical aperture) of the objective system 6 is small, the working distance of the objective system 6 is changed, while when it is larger, a part of lenses constituting the objective system 6 is moved, thereby enabling spherical aberration to be corrected.

In this way, the use of the objective lens for microscopes of the present invention makes it possible to observe the specimen, with always favorable imaging performance, in the case where either the glass or plastic vessel is used.

What is claimed is:

1. An objective lens for microscopes having an optical unit disposed on an optical axis at a front end of the objective lens, said optical unit comprising at least two kinds of optical elements which differ from one another in optical properties and are removable from the optical axis individually, so that a good imaging performance is maintained.

2. An objective lens for microscopes having an optical unit disposed on an optical axis at a front end of the objective lens, said optical unit comprising at least two kinds of optical elements which differ from one another in optical properties and are removable from the optical axis individually, so that a good chromatic aberration performance can be obtained.

3. An objective lens for microscopes having an optical unit disposed on an optical axis at a front end of the objective lens, said optical unit comprising at least two kinds of optical elements which differ from one another in Abbe's number and are removable from the optical axis individually, so that a good imaging performance is maintained.

4. An objective lens for microscopes having an optical unit disposed on an optical axis at a front end of the objective lens, said optical unit comprising at least two kinds of optical elements which differ from one another in Abbe's number and are removable from the optical axis individually, so that a good chromatic aberration performance can be obtained.

5. An objective lens for microscopes according to any one of claims 1, 2, 3 or 4, satisfying a condition:

$$v_{d1} < 35$$

where $v_{d1}$ is Abbe's number of one of said at least two kinds of optical elements.

6. An objective lens for microscopes according to claim 5, further satisfying a condition:

$$35 \leq v_{d2}$$

where $v_{d2}$ is Abbe's number of a remainder of said at least two kinds of optical elements.

7. An objective lens for microscopes according to any one of claims 1, 2, 3 or 4, satisfying a condition:

$$35 \leq v$$

where $v$ is Abbe's number of one of said at least two kinds of optical elements.

8. An objective lens for microscopes having an optical unit removably disposed on an optical axis at a front end of the objective lens, said optical unit comprising one kind of optical element different in Abbe's number from a specimen accommodating member which intervenes between a specimen and said objective lens.

* * * * *